United States Patent [19]

Tanaka et al.

[11] 3,901,865

[45] Aug. 26, 1975

[54] POLYMERIZATION OF CONJUGATED DIENE COMPOUNDS

[75] Inventors: Toyosuke Tanaka, Yono; Isamu Okuzumi, Toda; Tsuneo Matsuda, Urawa; Katsunori Kimijima, Yono, all of Japan

[73] Assignee: Saitama University, Saitama, Japan

[22] Filed: Nov. 16, 1973

[21] Appl. No.: 416,665

[30] Foreign Application Priority Data
Nov. 21, 1972  Japan.............................. 47-116412

[52] U.S. Cl. ............... 260/93.1; 260/94.3; 260/92.3
[51] Int. Cl........ C08d 3/04; C08d 3/06; C08d 1/14
[58] Field of Search ........... 260/94.3, 93.1; 252/432

[56] References Cited

UNITED STATES PATENTS

| | | | |
|---|---|---|---|
| 3,082,197 | 3/1963 | Witt | 260/94.3 |
| 3,189,589 | 6/1965 | Witt | 260/93.7 |
| 3,310,547 | 3/1967 | Mirviss et al. | 260/94.3 X |
| 3,597,367 | 8/1971 | Apotheker et al. | 252/432 X |
| 3,737,475 | 6/1973 | Mason | 252/429 B X |

*Primary Examiner*—William F. Hamrock
*Attorney, Agent, or Firm*—Sherman & Shalloway

[57] ABSTRACT

A method of polymerizing conjugated diene compounds which consists in contacting a monomeric conjugated diene compound with a polymerization initiator formed by mixing aluminum borohydride with a titanium halide.

9 Claims, No Drawings

POLYMERIZATION OF CONJUGATED DIENE COMPOUNDS

This invention relates to a new method of polymerizing the conjugated diene compounds.

It is well known that the conjugated dienes, and especially typically butadiene-1,3 and isoprene, form elastic polymers by the polymerization reaction. It has now been found that a hitherto unknown catalyst system, i.e., a polymerization initiator formed by mixing aluminum borohydride with a titanium halide, readily induces the polymerization of the monomeric conjugated diene compounds to provide elastic polymers.

The monomeric conjugated diene compounds, as here used, denote the straight chain, branched chain or cyclic diolefins, which may also have a halogen substituent. According to this invention, the foregoing compounds having 4 – 7 carbon atoms in their molecular structure are conveniently used as the starting material. As specific examples of these compounds, included are butadiene-1,3, isoprene, piperylene, chloroprene, 2,3-dimethylpentadiene-1,3, 2-ethylbutadiene-1,3, 2,3-dimethylbutadiene-1,3, 2-methylpentadiene-1,3, hexadiene-2,4, 4-methylhexadiene-1,3, 2-methylhexadiene-1,3, 2,4-dimethylpentadiene-1,3, cyclopentadiene, cyclohexadiene-1,3 and cyclobutadiene.

The new polymerization initiator of the present invention, as noted above, is formed by mixing aluminum borohydride with a titanium halide. The aluminum borohydride, $AlB_3H_{14}$, which can be prepared, for example, by the reaction of sodium borohydride and an aluminum halide, is a liquid having a boiling point of 44.5°C. and a melting point of −64.5°C. (see H. I. Schlesinger, et al., J. Ameri. Chem. Soc., 75 209 (1953). As the titanium halide, either titanium tetrachloride or titanium trichloride is preferably.

While aluminum borohydride is readily oxidized by the oxygen contained in air, a solution of aluminum borohydride in a liquid organic medium is not spontaneously inflammable in air, and thus the solution is relatively safely applicable for use. Hence, it is recommended that the mixing of the aluminum borohydride and the titanium halide be carried out in a liquid organic medium. Advantageously used as this organic medium are those which can dissolve at least one of either the aluminum borohydride or titanium halide and the conjugated diene compound that is to be polymerized. As convenient organic media, included are such, for example, as pentane, hexane, cyclohexane, benzene, toluene, xylene and tetrahydrofuran. At times, it is also possible to use as the liquid organic medium the conjugated diene compound that is to be polymerized.

The aluminum borohydride and the titanium halide are usually mixed in a molar ratio of 0.2 – 2.0, and preferably 0.8 – 1.5. The mixing is suitably carried out at a temperature ranging between −30° and +50°C. On mixing the two components in the liquid organic medium, there immediately forms a black-brown precipitate, which can be readily suspended in the liquid organic medium with stirring. The so formed precipitate possesses catalytic activity as a polymerization initiator. Thus, this liquid organic medium containing the precipitate can be used in its as-obtained state for the polymerization of the conjugated diene compounds. For achieving a uniform dispersion of the precipitate in the organic medium and thus make it possible to carry out the contact with the to-be-polymerized conjugated diene monomers more efficiently, it is an advantage that the precipitate be used in an amount of about 1 – 10 grams per liter of the organic medium. However, the amount in which the precipitate is used is not critical and may be outside of the foregoing range.

When the conjugated diene compound monomer is contacted with the foregoing liquid organic medium containing the polymerization initiator, the intended polymerization reaction proceeds readily. Since the polymerization initiator is decomposed by oxygen, carbon dioxide and water and loses its activity, the polymerization reaction must be carried out in an inert atmosphere, e.g., nitrogen or argon. However, even though there is initially present a minute quantity of oxygen, carbon dioxide or water, these react with a part of the polymerization initiator and are eliminated, and the polymerization is induced by the remaining portion of the polymerization initiator, the portion that has not yet been decomposed. The polymerization reaction is carried out at a temperature in the range of −10° – 100°C., and preferably 10° – 50°C. The diene monomer may be added to the liquid organic medium containing the polymerization initiator all at once or incrementally. The monomer concentration of the organic medium is preferably about 5 – 20% by weight. For achieving an efficient contact of the monomer and the polymerization initiator, the operation is preferably carried out under agitation. The reaction time will vary over a period ranging from one hour to 30 hours depending upon the class of monomer used and the reaction temperature employed. However, a reaction time of usually 2 – 20 hours is sufficient for achieving the objects of the invention.

After completion of the polymerization reaction, the resulting polymer in solution in the organic medium can be isolated by any of the known methods. A procedure wherein the reaction mixture is treated with either methanol, ethanol or butanol containing a small quantity of water is especially advantageous in decomposing the remaining polymerization initiator. This alcohol treatment serves to separate the resulting polymer as a precipitate. Thus, the polymer can be isolated by filtration or decantation and then be washed and dried.

The following examples are given for more fully illustrating the invention and are not to be construed as in limitation thereof.

EXAMPLE I

The apparatus employed consisted of a 200-ml stainless steel autoclave equipped with a mechanical stirrer and means for admitting nitrogen. Fifty ml of benzene, 0.027 gram (0.38 millimole) of aluminum borohydride and 0.072 gram (0.38 millimole) of titanium tetrachloride were charged to the foregoing autoclave under an atmosphere of nitrogen. After 10 minutes of agitation, a solution of 6.8 grams (0.1 mole) of isoprene in 50 ml of benzene was introduced to the mixture, after which the resulting mixture was stirred for 5 hours at 19°C.

0.05 Gram of N-phenyl-beta-naphthylamine as an antioxidant in 15 ml of methanol was added to the reaction mixture. The polymer product, on isolation and drying, weighed 6.0 grams. The product has 80% of the cis-1,4 structure according to its infrared spectra, a softening temperature of 240° – 270°C., and an average molecular weight of about 100,000.

EXAMPLE II

In the reaction described in Example I, a mixture of 0.027 gram of aluminum borohydride, 0.072 gram of titanium trichloride and 6.8 grams of isoprene with 100 ml of benzene gave 6.3 grams of a polymer product having 83% of the cis-1,4 structure.

EXAMPLE III

Using an apparatus identical to that described in Example I, 0.027 gram of aluminum borohydride, 0.072 gram of titanium tetrachloride and 5.4 grams (0.1 mole) of butadiene-1,3 with 100 ml of benzene were loaded in the vessel under a nitrogen atmosphere. After closing the vessel, the mixture was stirred for 5 hours at 23°C. This was followed by treating the reaction mixture as in Example I to obtain a polymer product having 53% of the cis-1,4 structure.

EXAMPLE IV

Using an apparatus identical to that described in Example I, 0.027 gram of aluminum borohydride, 0.072 gram of titanium tetrachloride and 8.2 grams (0.1 mole) of 2,3-dimethylbutadiene-1,3 with 100 mol of tetrahydrofuran were charged under a nitrogen atmosphere. After completion of the reaction for 20 hours at 29°C., the same treatment as that described in Example I was carried out to obtain 4.3 grams of a polymer product.

EXAMPLE V

The apparatus used was identical to that described in Example I, to which were charged under an atmosphere of nitrogen 0.027 gram of aluminum borohydride, 0.072 gram of titanium trichloride and 8.0 grams (0.1 mole) of cyclohexadiene-1,3 with 100 ml of benzene. After completion of the reaction for 20 hours at 50°C., the reaction mixture was submitted to the same treatment as that described in Example I to obtain 3.3 grams of a polymer product.

We claim:

1. A method of polymerizing conjugated diene compounds which comprises contacting a monomeric conjugated diene compound in a liquid organic medium at a temperature in the range of $-10°$ to $100°C$. with a polymerization initiator which is the solid reaction product formed by mixing aluminum borohydride component with a titanium halide component in a molar ratio ranging from 0.2:1 to 2:1.

2. The method of claim 1 wherein said monomeric conjugated diene compound is selected from the group consisting of the straight chain, branched chain and cyclic diolefins having 4 – 7 carbon atoms in their molecular structure substituted derivatives thereof.

3. The method of claim 1 wherein said titanium halide is selected from the group consisting of titanium trichloride and titanium tetrachloride.

4. The method of claim 1 wherein said liquid organic medium is a solvent which can dissolve at least one of the components forming said polymerization initiator as well as the conjugated diene compound to be polymerized.

5. The method of claim 1 wherein said polymerization initiator is suspended in said liquid organic medium at the rate of 1 – 10 grams per liter of the latter.

6. The method of claim 1 wherein said monomeric conjugated diene compound is selected from the group consisting of butadiene-1,3, isoprene, 2,3-dimethylbutadiene-1,3 and cyclohexadiene.

7. The method of claim 1 wherein the molar ratio of aluminum borohydride to titanium halide ranges from 0.8:1 to 1.5:1.

8. The method of claim 1 wherein the conjugated monomer concentration in the organic liquid medium is about 5 to 20 percent by weight.

9. The method of claim 4 wherein said liquid organic medium is selected from the group consisting of pentane, hexane, cyclohexane, benzene, toluene, xylene and tetrahydrofuran.

* * * * *